US012467396B1

(12) United States Patent
Yi et al.

(10) Patent No.: US 12,467,396 B1
(45) Date of Patent: Nov. 11, 2025

(54) ELECTRICALLY HEATED MIXER ASSEMBLY FOR AN EXHAUST AFTERTREATMENT SYSTEM (71) Applicant: Caterpillar Inc., Peoria, IL (US)

(72) Inventors: Yong Yi, Dunlap, IL (US); Ryan James Kominkiewicz, Morton, IL (US); Brandon Neuhoff, Dunlap, IL (US); Anna Johnson, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/660,298

(22) Filed: May 10, 2024

(51) Int. Cl.
F01N 3/20 (2006.01)
B01F 25/40 (2022.01)
B01F 25/41 (2022.01)
B01F 25/42 (2022.01)
F01N 3/035 (2006.01)
F01N 3/10 (2006.01)
F01N 3/28 (2006.01)
F01N 5/02 (2006.01)

(52) U.S. Cl.
CPC ............. F01N 3/208 (2013.01); F01N 3/035 (2013.01); F01N 3/106 (2013.01); F01N 5/02 (2013.01); B01F 25/40 (2022.01); B01F 25/41 (2022.01); B01F 25/42 (2022.01); F01N 3/206 (2013.01); F01N 3/2066 (2013.01); F01N 3/2892 (2013.01); F01N 2240/16 (2013.01); F01N 2330/38 (2013.01); F01N 2550/22 (2013.01); F01N 2610/02 (2013.01); F01N 2610/102 (2013.01); F01N 2900/0602 (2013.01); F01N 2900/1411 (2013.01)

(58) Field of Classification Search
CPC combination set(s) only.
See application file for complete search history.

(56) References Cited

U.S. PATENT DOCUMENTS

| 9,464,558 | B2 * | 10/2016 | Többen | ................ | F01N 3/0253 |
| 10,190,463 | B2 | 1/2019 | Kurpejovic et al. | | |
| 11,261,776 | B2 | 3/2022 | Masoudi et al. | | |
| 11,506,099 | B1 * | 11/2022 | Harris | ............... | B01F 23/21321 |
| 2003/0213234 | A1 * | 11/2003 | Funk | ................ | B01F 25/31322 |
| | | | | | 60/285 |
| 2014/0050628 | A1 * | 2/2014 | Nakano | ................ | B01F 25/431 |
| | | | | | 422/173 |
| 2018/0195427 | A1 * | 7/2018 | Pandit | ................... | F01N 3/2013 |
| 2021/0003056 | A1 * | 1/2021 | Huang | ................. | F01N 3/0807 |
| 2021/0095588 | A1 | 4/2021 | Gandikota et al. | | |
| 2021/0310394 | A1 * | 10/2021 | Volmerding | ............ | B01F 25/25 |
| 2022/0403766 | A1 * | 12/2022 | Masoudi | ............... | F01N 3/2013 |

* cited by examiner

Primary Examiner — Binh Q Tran
(74) Attorney, Agent, or Firm — Xsensus LLC (57) ABSTRACT A mixer assembly for mixing, in a mixing tube of an exhaust aftertreatment system, a reductant with an exhaust gas from an internal combustion engine may include a mixer and an electrically heated heating element. The mixer may be positioned in proximity to the reductant injector. The electrically heated heating element may be positioned in proximity to an impingement surface of the mixer. The reductant may directly impinge, after being injected, on the impingement surface causing the reductant to vaporize and mix with the exhaust gas forming a vaporized reductant and exhaust gas mixtures that flows along a flow path defined by the mixing tube. The vaporized reductant and exhaust gas mixture may be heated and further mixed by the electrically heated heating element.

20 Claims, 7 Drawing Sheets

ELECTRICALLY HEATED MIXER ASSEMBLY FOR AN EXHAUST AFTERTREATMENT SYSTEM

TECHNICAL FIELD

The present disclosure relates to an electrically heated mixer assembly for an exhaust aftertreatment system, and, more particularly, to an electrically heated mixer assembly including a mixer and an electrically heated heating element for vaporizing a reductant and mixing the vaporized reductant with an exhaust gas from an internal combustion engine.

BACKGROUND

Exhaust aftertreatment systems, such as selective catalytic reduction (SCR) aftertreatment systems, are used to reduce harmful pollutants in exhaust gas produced by internal combustion engines. SCR aftertreatment systems operate by blending diesel exhaust fluid (DEF), which is typically a solution of urea in deionized water, with nitrogen oxides present in the exhaust gases of internal combustion engines. The mixed solution of the DEF and the nitrogen oxides interacts with an SCR catalyst which facilitates a chemical reaction that converts the nitrogen oxides into nitrogen and water vapor. However, SCR aftertreatment systems can face challenges and drawbacks, such as inadequate blending of the DEF with the nitrogen oxides, frequent reductant deposit removal, air flow loss, and back pressure, among other examples.

SUMMARY

Some implementations described herein relate to a mixer assembly for mixing a reductant with exhaust gas in a selective catalytic reduction (SCR) aftertreatment system. The SCR aftertreatment system may include an exhaust conduit that permits the exhaust gas to enter a mixing tube of the SCR aftertreatment system and a reductant injector that injects the reductant into the mixing tube. The mixer assembly may include an electrically heated heating element, disposed within the mixing tube and in proximity to the reductant injector that generates heat; and a body disposed within the mixing tube in proximity to the electrically heated heating element and the reductant injector, the body including an impingement surface, wherein the impingement surface is located at a position that enables the impingement surface to be heated by the heat and that enables the reductant, after being injected by the reductant injector, to directly impinge on, and be heated by, the impingement surface causing the reductant to vaporize and become a vaporized reductant that mixes with the exhaust gas forming a vaporized reductant and exhaust gas mixture that flows along a flow path defined by the mixing tube, wherein the electrically heated heating element is located within the flow path, and wherein the vaporized reductant and exhaust gas mixture is heated by the heat and further mixed by the electrically heated heating element.

Some implementations described herein relate to a method for mixing, in a mixing tube of an exhaust aftertreatment system, a reductant with an exhaust gas from an internal combustion engine. The method may include heating, by an electrically heated heating element positioned in proximity to an impingement surface of a mixer, the impingement surface; injecting, by a reductant injector positioned in proximity to the impingement surface, the reductant causing the reductant to directly impinge on the impingement surface, vaporize, and mix with the exhaust gas forming a vaporized reductant and exhaust gas mixtures that flows along a flow path defined by the mixing tube; and heating and mixing, by the electrically heated heating element, the vaporized reductant and exhaust gas mixture before the vaporized reductant and exhaust gas enters a selective catalytic reduction (SCR) catalyst that is in fluid communication with the mixing tube.

Some implementations described herein relate to a selective catalytic reduction (SCR) aftertreatment system for treating exhaust gas from an internal combustion engine. The SCR aftertreatment system may include: a mixing tube including an inlet end, an outlet end, and an injector port, wherein the injector port includes an opening; a diesel exhaust fuel (DEF) injector, communicably coupled with the mixing tube via the injector port, that injects DEF into the mixing tube; and a mixer assembly including: an electrically heated heating element disposed within the mixing tube and in proximity to the reductant injector; a body, disposed within the mixing tube in proximity to the electrically heated heating element and reductant injector, including an impingement surface; and an SCR catalyst positioned downstream of the electrically heated heating element and in fluid communication with the mixing tube, wherein the impingement surface is located at a position that enables the electrically heated heating element to heat the impingement surface and that enables direct impingement of the reductant, after being injected, on the impingement surface to vaporize and mix the reductant with the exhaust gas forming a vaporized reductant and exhaust gas mixture that flows along a flow path of the mixing tube, and wherein the electrically heated heating element is positioned within the flow path to heat and further mix the reductant and exhaust gas mixture before the reductant and exhaust gas mixture enters the SCR catalyst.

DETAILED DESCRIPTION

The present disclosure relates to an electrically heated mixer assembly for an exhaust aftertreatment system (e.g., a selective reduction catalyst (SCR) aftertreatment system), and, more particularly, to an electrically heated mixer assembly including a mixer and an electrically heated heating element for vaporizing a reductant (e.g., diesel exhaust fuel (DEF)) and mixing the vaporized reductant with an exhaust gas from an internal combustion engine. The mixer may be positioned in proximity to a reductant injector (e.g., a DEF injector) such that the reductant, after being injected, directly impinges on the mixer. Furthermore, the electrically heated heating element may be positioned in proximity to the mixer such that the surface of the mixer is heated, which promotes vaporization of the reductant into a vaporized reductant and mixing of the vaporized reductant with the exhaust gas. In this way, the electrically heated mixer assembly can achieve a high mixing quality (e.g., at least 99% mixing quality), high deposit robustness for reductant dosing at low temperatures (e.g., less than approximately 160 degrees Celsius), and low air flow floss.

Figure 1A:
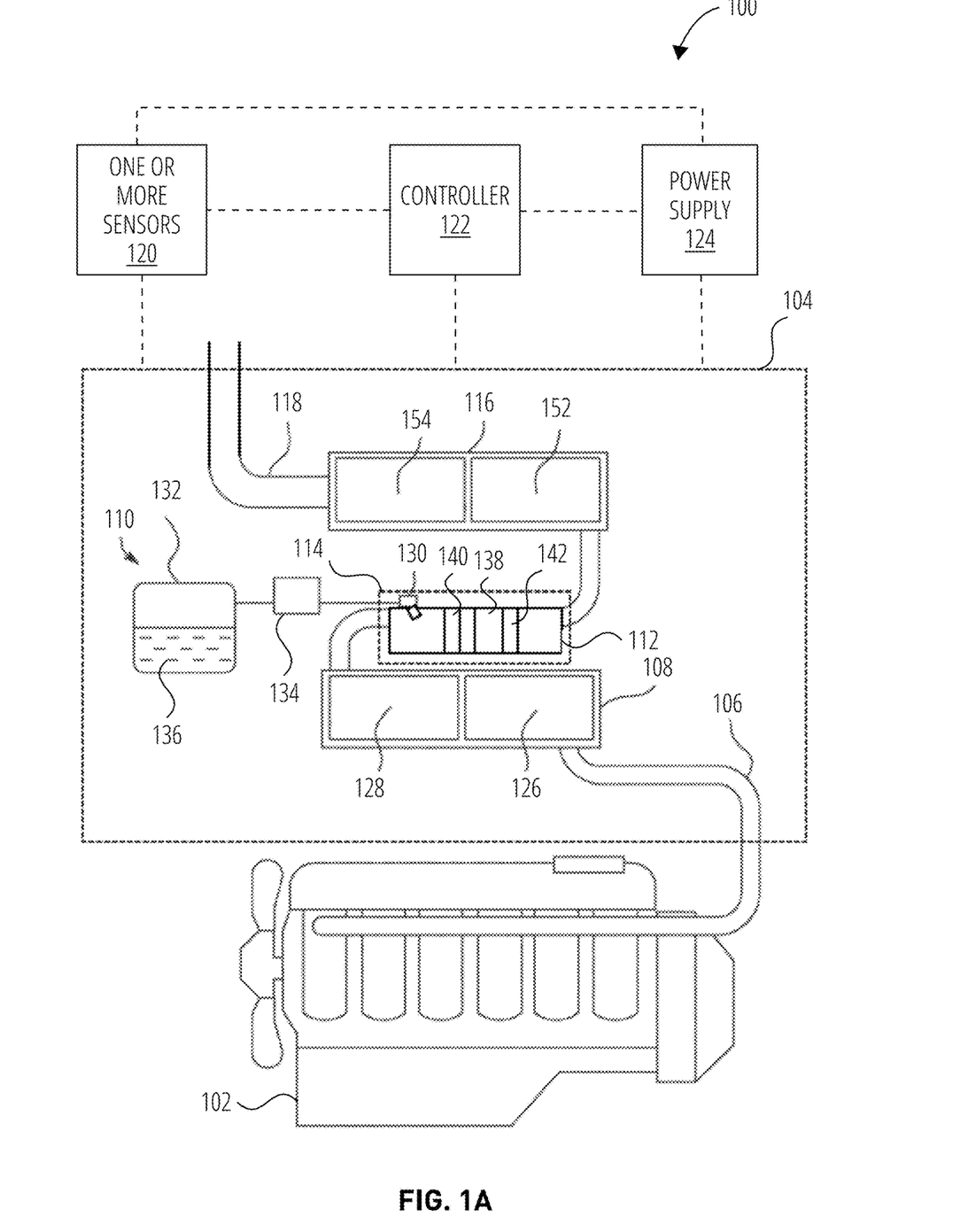
FIGS. 1A-1F are diagrams of an example associated with an electrically heated mixer assembly for an exhaust aftertreatment system in accordance with some embodiments of the present disclosure.

FIGS. 1A-1F are diagrams of an example associated with an electrically heated mixer assembly for an exhaust aftertreatment system in accordance with some embodiments of the present disclosure. FIG. 1A is a diagram of an example engine system 100 described herein.

As shown in FIG. 1A, the engine system 100 includes an engine 102 and an exhaust aftertreatment system 104. The engine 102 may be an internal combustion engine, such as a reciprocating piston engine or a gas turbine engine, among other examples. Furthermore, the engine 102 may be a spark ignition engine or a compression ignition engine, such as, a diesel engine, a homogeneous charge compression ignition engine, or a reactivity-controlled compression ignition engine, among other examples. Additionally, the engine 102 may be fueled by gasoline, diesel fuel, biodiesel, dimethyl ether, alcohol, natural gas, propane, hydrogen, combinations thereof, or any other suitable combustion fuel.

The engine 102 may include other components, such as a turbocharger, an air intake system and/or a drivetrain including a transmission system, among other examples. The engine 102 may be used to provide power to any suitable machine, such as an on-highway truck, an off-highway truck, an earth moving machine, and/or an electric generator, among other examples. Accordingly, the engine system 100 may be associated with any suitable industry, such as a transportation industry, a construction industry, an agriculture industry, a forestry industry, a power generation industry, and/or a material handling industry, among other examples.

The engine 102 produces an exhaust gas (e.g., during an internal combustion process). The exhaust gas includes various pollutants (e.g., nitrogen oxides, carbon dioxide, water vapor, carbon monoxide, unburned hydrocarbons, and/or particulate matter, among other examples). The exhaust aftertreatment system 104 is in fluid communication with the engine 102. In this way, the exhaust aftertreatment system 104 may receive, and the engine may provide (e.g., expel), the exhaust gas for treatment by the exhaust aftertreatment system 104 (e.g., the exhaust aftertreatment system 104 may process the exhaust gas to trap and/or reduce the pollutants contained within the exhaust gas before the exhaust gas is released to the atmosphere).

As further shown in FIG. 1A, the exhaust aftertreatment system 104 includes an exhaust conduit 106, a first aftertreatment assembly 108, a reductant supply system 110, a mixing tube 112, a mixer assembly 114, a second aftertreatment assembly 116, an exhaust stack 118, one or more sensors 120, a controller 122 (e.g., an electronic control module ECM)), and a power supply 124. The exhaust conduit 106 is in fluid communication with the engine 102 and receives exhaust gas expelled from the engine 102.

The first aftertreatment assembly 108 includes a first aftertreatment device 126 positioned downstream of the exhaust conduit 106 and a second aftertreatment device 128 positioned downstream of the first aftertreatment device 126. In some implementations, the first aftertreatment device 126 may be a diesel oxidation catalyst (DOC) (e.g., which facilitates oxidation of pollutants in the exhaust gas) and the second aftertreatment device 128 may be a diesel particulate filter (DPF) (e.g., which filters particulate matter from the exhaust gas as it flows through the DPF), as described in more detail elsewhere herein.

Accordingly, for example, the exhaust gas (e.g., provided by the engine 102 via the exhaust conduit 106 to the exhaust aftertreatment system 104) may pass through the DOC before passing through the DPF. The DOC converts nitric oxide into nitrogen dioxide and oxidizes carbon monoxide and hydrocarbons (e.g., the carbon monoxide reacts with oxygen over the DOC to produce carbon dioxide, and hydrocarbons react with the oxygen over the DOC to produce carbon dioxide and water). After flowing through the DOC, the exhaust gas passes through the DPF. The DPF captures particulate matter, soot, and ash, preventing the particulate matter, soot, and ash from entering the atmosphere. The soot may be removed via regeneration (e.g., via a passive regeneration system that can elevate exhaust temperatures to promote oxidation and removal of the soot in the DPF). Following the DPF, the exhaust gas flows into the mixing tube 112 where the exhaust gas interacts with the mixer assembly 114, as described in more detail elsewhere herein.

As further shown in FIG. 1A, the reductant supply system 110 includes a reductant injector 130, a reductant tank 132, and a pump assembly 134. The reductant tank 132 stores a reductant 136, such as diesel exhaust fuel (DEF). The pump assembly 134 may provide the reductant 136 to the reductant injector 130, and the reductant injector 130 may inject the reductant 136 into the mixing tube 112, as described in more detail elsewhere herein. As an example, the reductant injector 130 may inject the reductant 136 into the mixing tube 112 causing the reductant 136 to directly impinge on a portion of the mixer assembly 114, vaporize, and mix with the exhaust gas forming a vaporized reductant and exhaust gas mixtures that flows along a flow path defined by the mixing tube 112, as described in more detail elsewhere herein. The reductant injector 130 may be a closely-coupled reductant injector or any other suitable injector.

As further shown in FIG. 1A, the mixer assembly 114 includes a mixer 138 positioned within the mixing tube 112 and downstream of the reductant injector 130, a heating element 140 (e.g., an electrically heated heating element) positioned within the mixing tube 112 and downstream of the mixer 138, and a gas-phase mixer 142 positioned within the mixing tube 112, downstream of the heating element 140, and upstream of the second aftertreatment assembly 116.

Figure 1B:
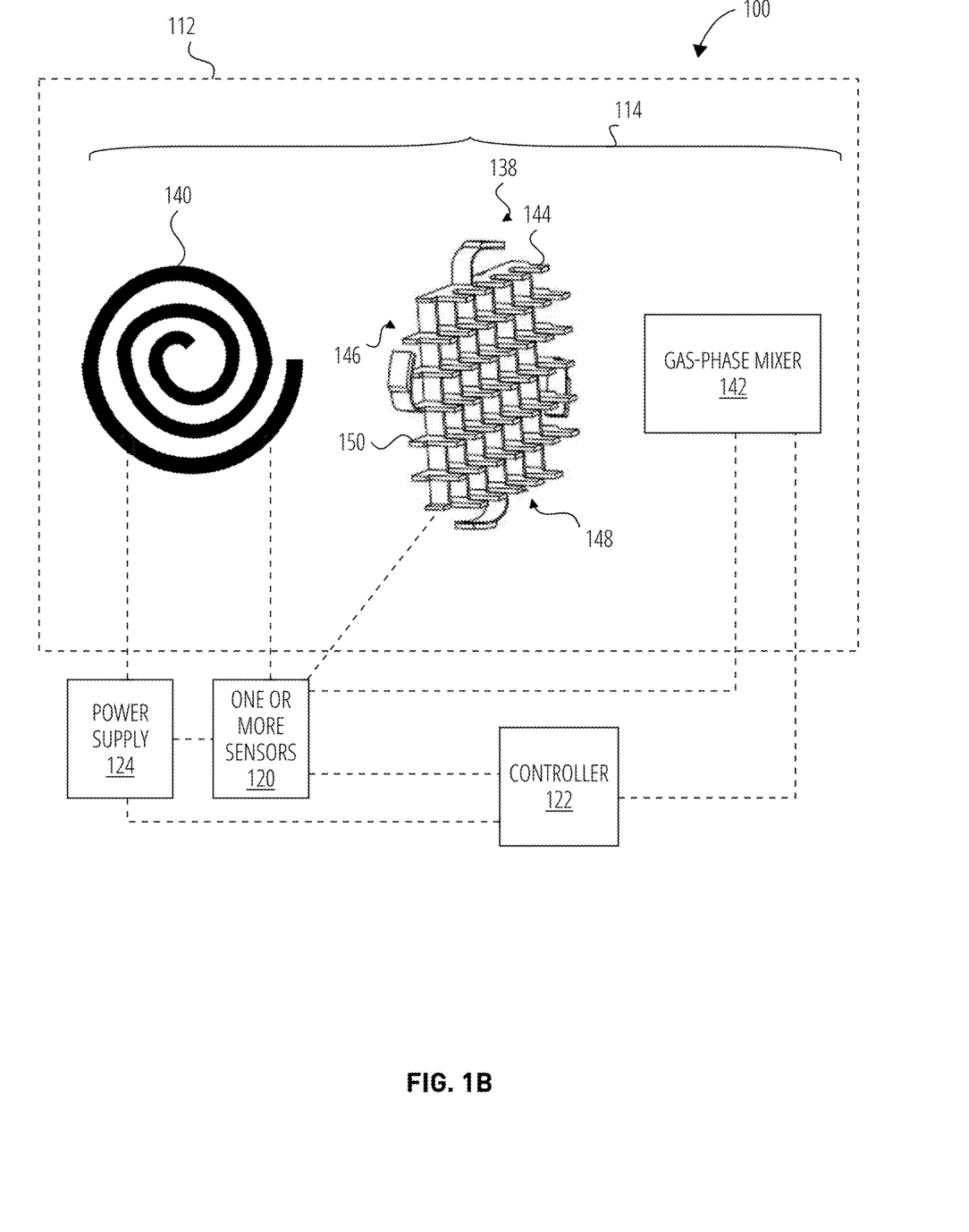
Figure 1C:
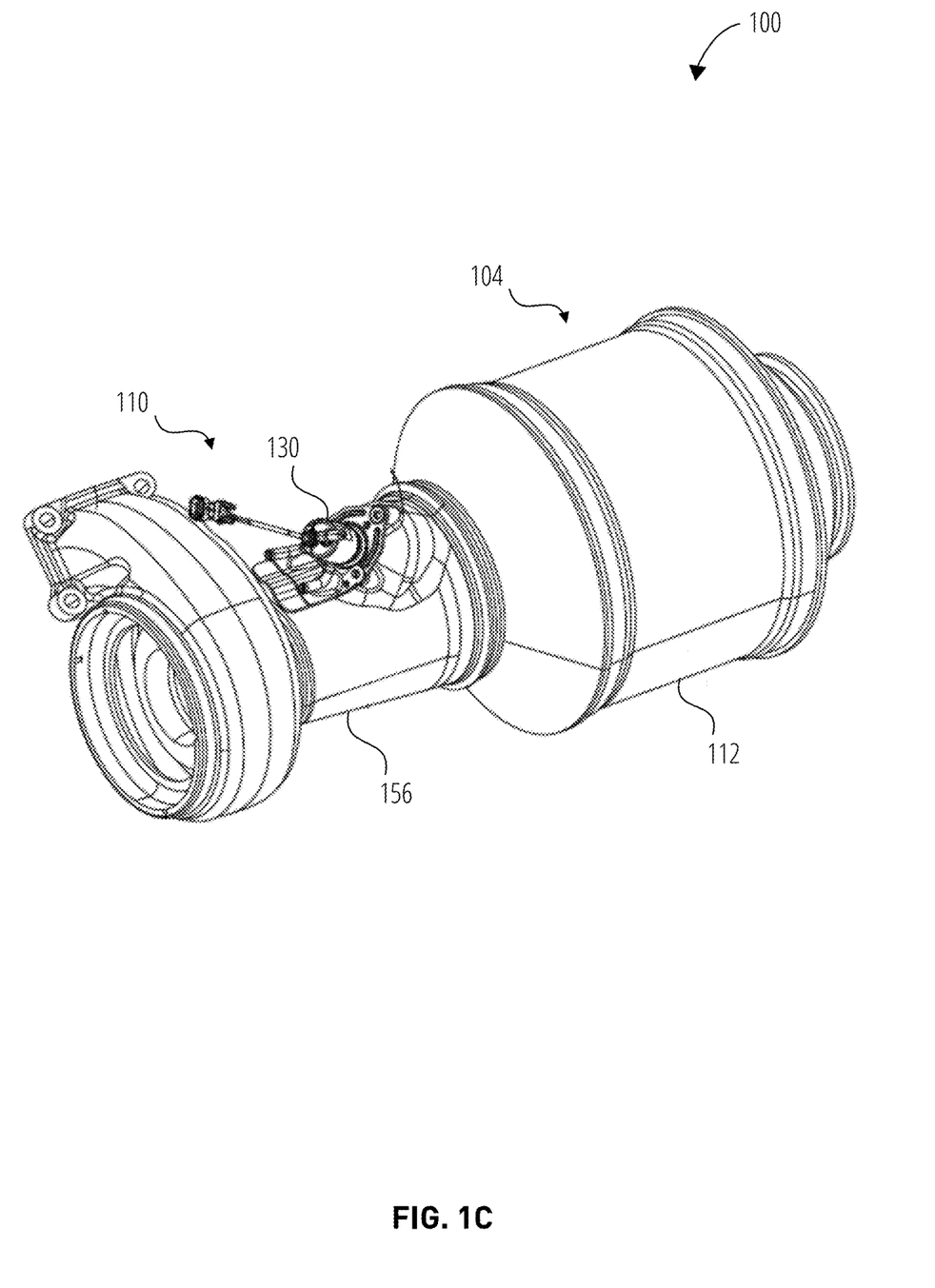

As shown in FIG. 1B, the mixer 138 includes a body 144 having an inlet end 146, an outlet end 148, and a surface 150 (e.g., an impingement surface). The surface 150 may be positioned in proximity to, and downstream of, the reductant injector 130. In this way, the reductant 136 may directly impinge on the surface 150 after being injected into the mixing tube 112.

As further shown in FIG. 1B, the heating element 140 is an electrically heated heating element (e.g., a spiral coil). The heating element 140 may be positioned in proximity to, and downstream of, the surface 150 to enable the heating element 140 to heat the surface 150. As an example, the heating element 140 may be directly coupled to the body 144 at the outlet end 148 of the body 144 to enable the heating element 140 to heat the surface 150. In this way, the heating element 140 heats the surface 150 before the reductant 136 is injected into the mixing tube 112 which facilitates vaporization of the reductant 136 when the reductant 136 directly impinges on the surface 150 after being injected into the mixing tube 112.

Accordingly, the mixer 138 may be located at a position that enables the heat (e.g., generated by the heating element 140) to heat the mixer 138 and that enables direct impingement of the reductant 136, after being injected, on the mixer 138, which promotes vaporization of the reductant 136 into a vaporized reductant and mixing of the vaporized reductant with the exhaust gas forming a vaporized reductant and exhaust gas mixture that flows along a flow path defined by the mixing tube 112. Although the mixer 138 is described in connection with FIG. 1B as including the body 144 having the inlet end 146, the outlet end 148, and the surface 150, the mixer 138 may be any suitable mixing device and may take on any suitable configuration. Additionally, although the heating element 140 is shown and described in connection with FIG. 1B as being a spiral coil, the heating element 140 may be any suitable electrically heated heating element.

The power supply 124 may provide a power output that causes the heating element 140 to generate heat. As an example, the power supply 124 may provide (e.g., to the heating element 140) a power output in a range of approximately 1 kilowatt to 1.5 kilowatts. Although the power output provided to the heating element 140 is described as being in a range of approximately 1 kilowatt to 1.5 kilowatts, the power output may be any suitable power output (e.g., to maintain a proper surface temperature for optimal reductant evaporation and mixing, among other examples).

After passing by the heating element 140 (e.g., within the mixing tube 112), the vaporized reductant and exhaust gas mixture flows through the gas-phase mixer 142, which further mixes the vaporized reductant and exhaust gas mixture before the vaporized reductant and exhaust gas mixture enters the second aftertreatment assembly 116, as described in more detail elsewhere herein.

As further shown in FIG. 1A, the second aftertreatment assembly 116 includes a third aftertreatment device 152 positioned downstream of the gas-phase mixer 142 and in fluid communication with the mixing tube 112 and a fourth aftertreatment device 154 positioned downstream of the third aftertreatment device 152. The fourth aftertreatment device 154 is in fluid communication with the exhaust stack 118.

In some implementations, the third aftertreatment device 152 may be an SCR catalyst and the fourth aftertreatment device 154 may be an ammonia oxidation catalyst (AMOX). Nitric oxide and nitrogen dioxide react with the ammonia in the presence of the SCR catalyst producing nitrogen and water. Furthermore, to ensure sufficient nitrogen oxide reduction, a small amount of excess reductant 136 may be injected into the exhaust gas flow (e.g., into the exhaust gas stream). This excess reductant 136 may pass through the SCR catalyst as ammonia.

To prevent excess ammonia from entering the atmosphere, the exhaust gas enters and flows through the AMOX where the ammonia reacts with oxygen in the presence of the AMOX to form nitrogen and water. Accordingly, the vaporized reductant and exhaust gas mixture may pass through the third aftertreatment device 152 and the fourth aftertreatment device 154 causing the pollutants to be reduced. The processed exhaust gas exits the exhaust stack 118 into the atmosphere.

Although the components of the engine system 100 (e.g., the components of the engine 102 and the components of the exhaust aftertreatment system 104) are shown and described in connection with FIGS. 1A-1F as being located at particular positions or locations relative to one another, the components of the engine system 100 may be positioned at any suitable location relative to one another. For example, although the mixer 138, the heating element 140, and the gas-phase mixer 142 are shown and described in connection with FIG. 1A as being in particular locations within the mixing tube 112 (e.g., the heating element 140 is shown as being downstream of the reductant injector 130 and upstream of the mixer 138, the mixer 138 is shown as being downstream of the heating element 140 and upstream of the gas-phase mixer 142, and the gas-phase mixer 142 is shown as being downstream of the mixer 138 and upstream of the second aftertreatment assembly 116), the mixer 138, the heating element 140, and/or the gas-phase mixer 142 may be positioned in any suitable location within the mixing tube 112 and/or at any suitable location within the exhaust aftertreatment system 104, among other examples.

Furthermore, although the mixer assembly 114 is shown and described in connection with FIGS. 1A-1F as including a single heating element 140, the mixer assembly 114 may include any suitable number of heating elements and/or other components, among other examples. As an example, the mixer assembly 114 may include a first heating element positioned in proximity to and upstream of the mixer 138 and a second heating element positioned in proximity and downstream of the mixer 138, among other examples).

Additionally, although the exhaust aftertreatment system 104 is shown and described in connection with FIG. 1A as including multiple systems and assemblies, the exhaust aftertreatment system 104 may include any suitable number of systems and assemblies (e.g., the first aftertreatment assembly 108 may be omitted for various engine applications in which the exhaust treatment function provided by the first aftertreatment assembly 108 is not desired or required, among other examples).

The one or more sensors 120 may detect and/or measure one or more parameters associated with the engine system 100 (e.g., the one or more sensors may detect and/or measure one or more parameters associated with the engine 102 and/or the exhaust aftertreatment system 104, among other examples). Accordingly, for example, the one or more sensors 120 may include one or more temperature sensors (e.g., to measure one or more temperatures associated with the engine system 100), one or more speed sensors (e.g., to measure one or more speeds associated with the engine system 100), one or more chemical composition sensors (e.g., to measure one or more chemical compositions associated with the engine system 100, such as a chemical composition of the exhaust gas flowing through the exhaust aftertreatment system 104), one or more pressure sensors (e.g., to measure one or more pressure associated with the engine system 100), one or more airflow sensors (e.g., to measure one or more air flows associated with the engine system 100), and/or one or more engine brake sensors (e.g., to one or more engine braking power measurements), among other examples.

The one or more sensors 120 may provide, and the controller 122 may receive, data indicating the one or more parameters associated with the engine system 100. The controller 122 may perform one or more actions based on the one or more parameters (e.g., the controller 122 may control one or more components of the engine 102 and/or the exhaust aftertreatment system 104 based on the one or more parameters). As an example, the controller 122 may control the power output provided by the power supply 124 to the heating element 140 to maintain the surface 150 of the mixer 138 at a constant temperature, such as a constant temperature that is less than 300 degrees Celsius, among other examples.

Figure 1D:
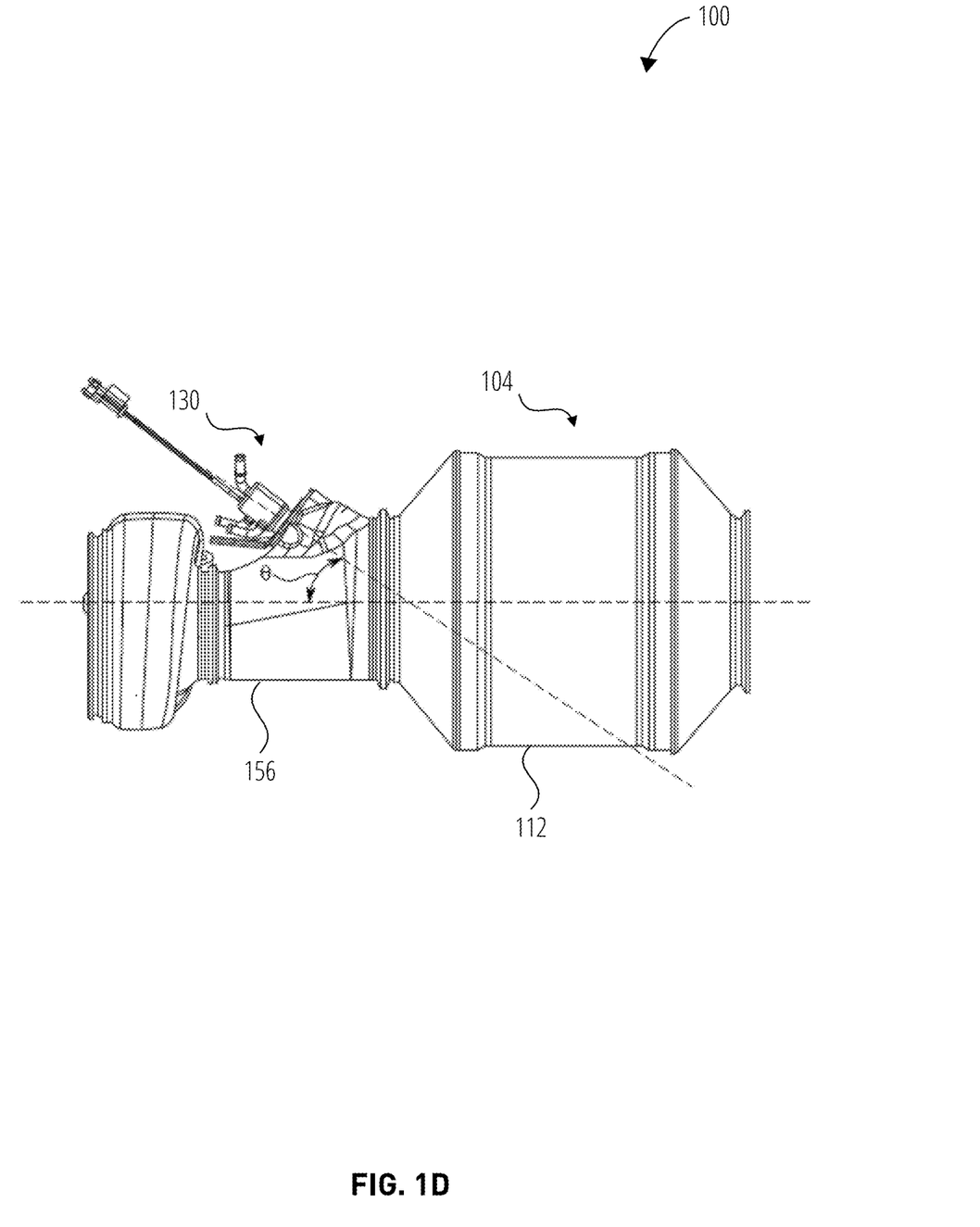
Figure 1E:
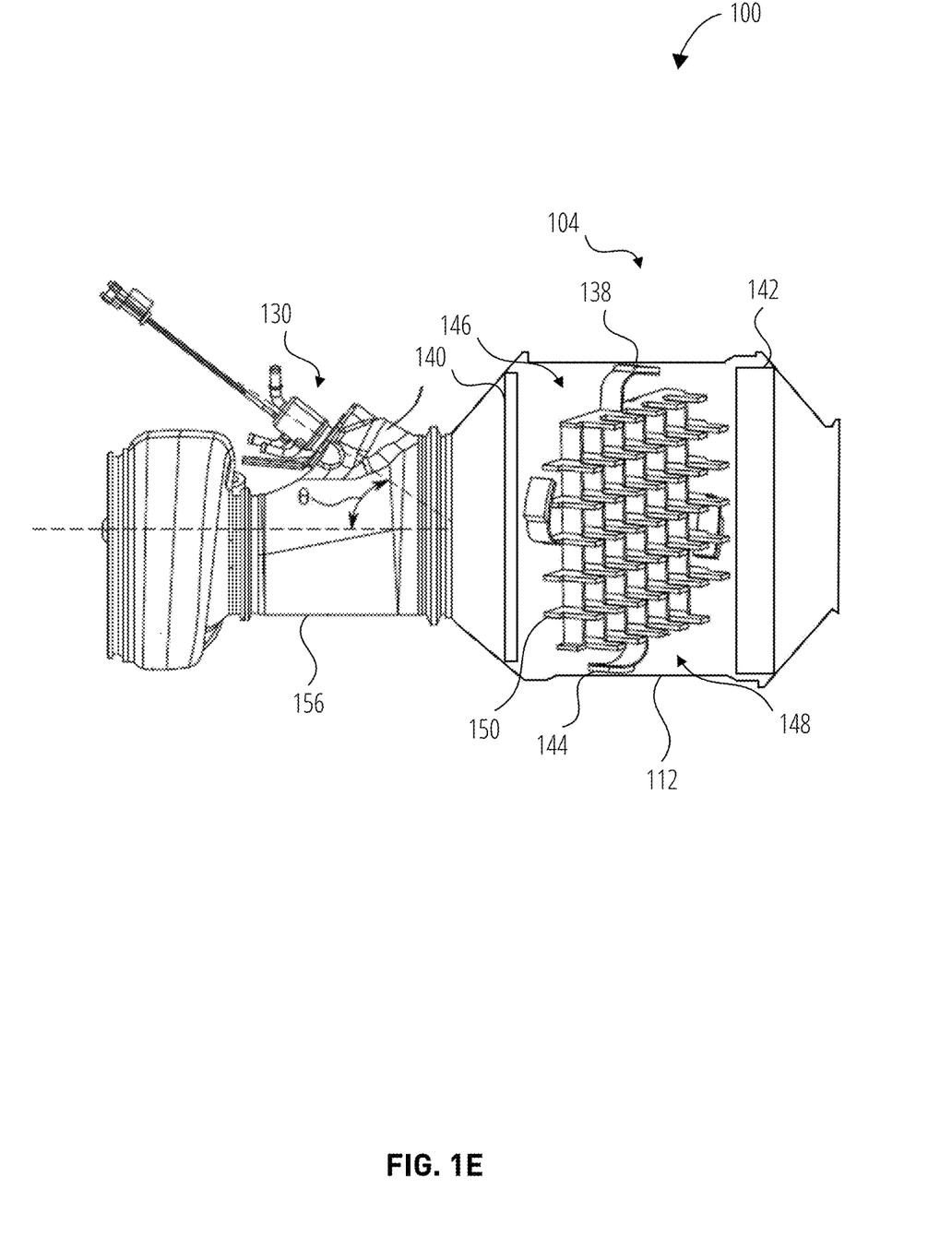
Figure 1F:
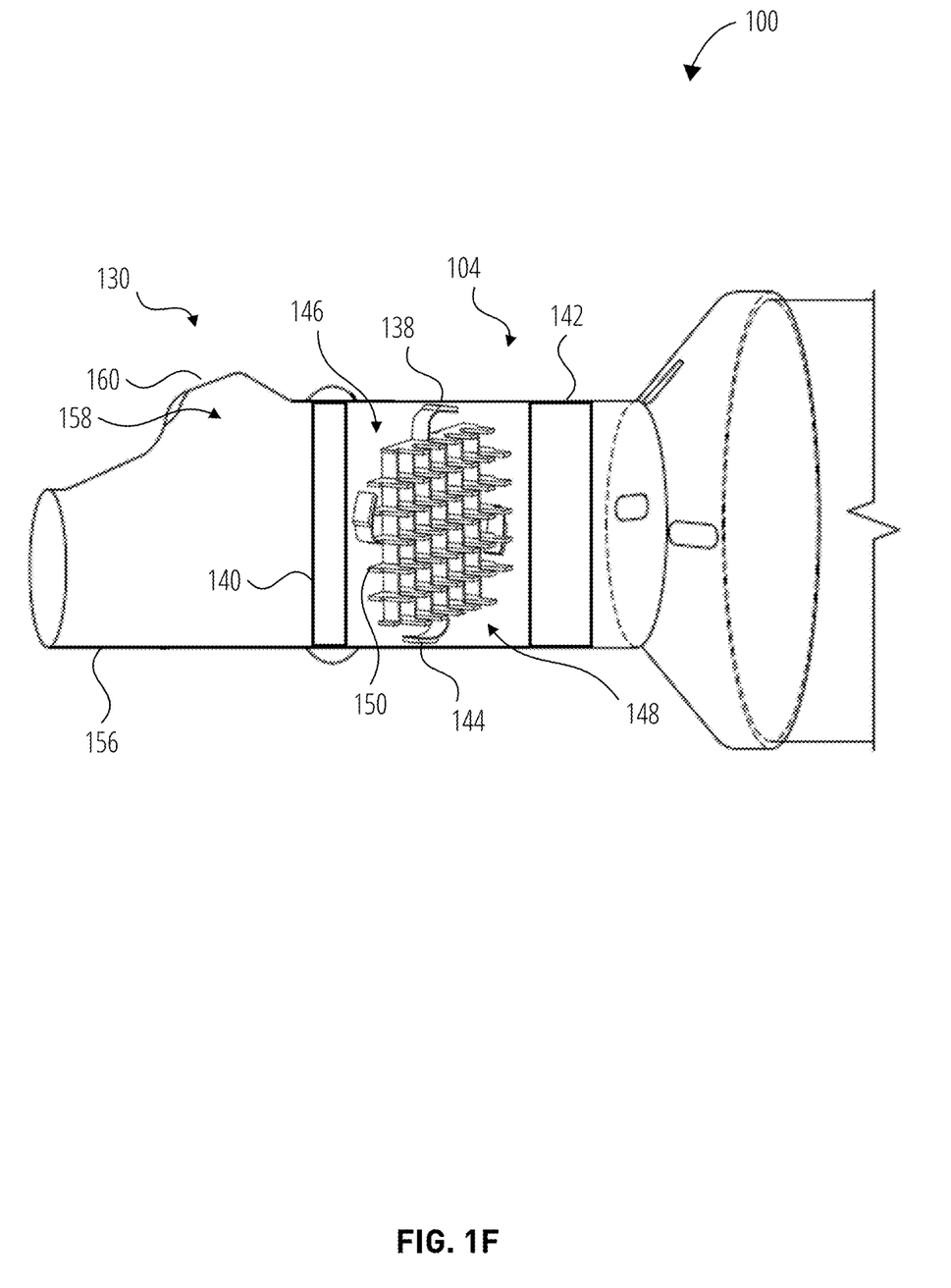

As shown in FIGS. 1C-1F, the reductant injector 130 may be communicably coupled to the exhaust aftertreatment system 104 via an adaptor 156 (e.g., an injector adaptor may be communicably coupled to the exhaust conduit 106 on one end and to the exhaust aftertreatment system 104 on another end). The adaptor 156 may enable the reductant injector 130 to be in fluid communication with an interior of the mixing tube 112 (e.g., the reductant injector 130 may be communicably coupled to an interior volume 158 of the mixing tube 112 via an opening 160 in the adaptor 156 as shown in FIG. 1F).

The reductant injector 130 may be inject the reductant into the interior volume 158 of the mixing tube 112 at an angle θ relative to a longitudinal axis extending through the adaptor 156 (e.g., as shown in FIGS. 1D-IE). In some implementations, the angle θ may be an acute angle. For example, the angle θ may be an angle in a range of approximately 20 degrees to 50 degrees. However, the angle θ may be any suitable angle (e.g., based on a configuration and/or a location of one or more components of the exhaust aftertreatment system 104).

Although the reductant injector 130 is shown and described as being directly connected to the exhaust aftertreatment system 104 via the adaptor 156, the reductant injector 130 may be communicably coupled to the exhaust aftertreatment system 104 in any suitable manner. Furthermore, although various positions of the components of the exhaust aftertreatment system 104 have been described herein (e.g., upstream or downstream of other components), the components of the exhaust aftertreatment system 104 may be position in any suitable position.

INDUSTRIAL APPLICABILITY

Figure 2:
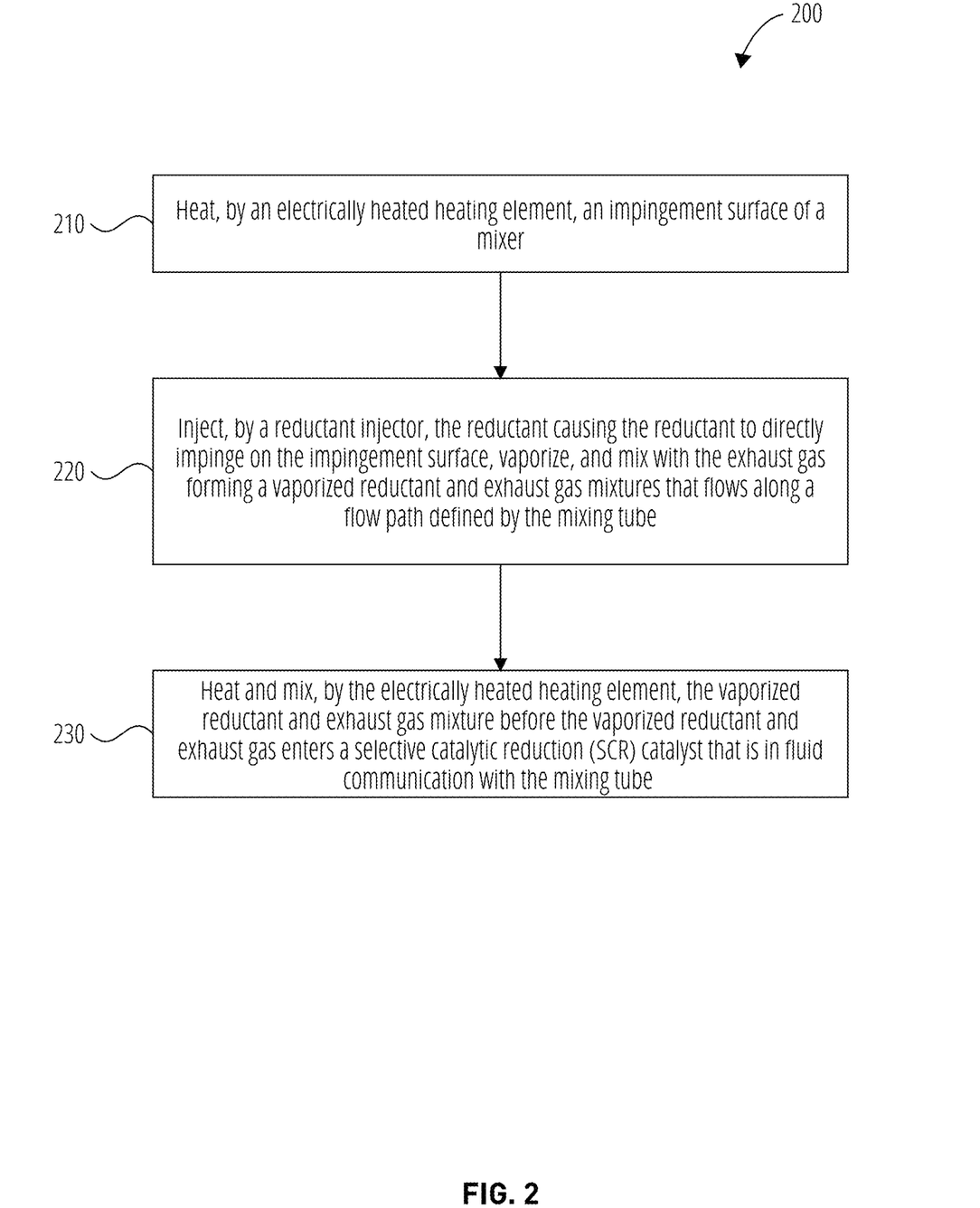
FIG. 2 is a flowchart of an example process associated with systems and methods for mixing, in a mixing tube of an exhaust aftertreatment system, a reductant with an exhaust gas from an internal combustion engine in accordance with some embodiments of the present disclosure.

As noted above, embodiments of the disclosed subject matter pertain to an electrically heated mixer assembly for an exhaust aftertreatment system, and, more particularly, to an electrically heated mixer assembly including a mixer and an electrically heated heating element for vaporizing a reductant and mixing the vaporized reductant with an exhaust gas from an internal combustion engine. FIG. 2 is a flowchart of an example process 200 associated with systems and methods for mixing, in a mixing tube of an exhaust aftertreatment system, a reductant with an exhaust gas from an internal combustion engine. As shown in FIG. 2, the process 200 may include heating, by an electrically heated heating element, an impingement surface of a mixer (block 210). As further shown in FIG. 2, the process 200 may include injecting, by a reductant injector, the reductant causing the reductant to directly impinge on the impingement surface, vaporize, and mix with the exhaust gas forming a vaporized reductant and exhaust gas mixtures that flows along a flow path defined by the mixing tube (block 220).

As further shown in FIG. 2, the process 200 may include heating and mixing, by the electrically heated heating element, the vaporized reductant and exhaust gas mixture before the vaporized reductant and exhaust gas enters a selective catalytic reduction (SCR) catalyst that is in fluid communication with the mixing tube (block 230). In some implementations, the process 200 may include mixing, by a gas-phase mixer provided within the flow path, the vaporized reductant and exhaust gas mixture before the vaporized reductant and exhaust gas mixture enters the SCR catalyst. In some implementations, the process 200 may include maintaining, by the electrically heated heating element, the impingement surface at a constant temperature that is less than approximately 300 degrees Celsius.

The mixer may include an inlet end and an outlet end (e.g., the inlet end 146 and the outlet end 148 of the body 144), and the heating element may be positioned at the outlet end of the mixer. In some implementations, the process 200 may include treating the exhaust gas using at least one of a diesel oxidation catalyst (DOC) positioned in proximity to the reductant injector or a diesel particulate filer (DPF) positioned in proximity to the reductant injector. Because the mixer is positioned in proximity to the reductant injector, and because the electrically heated heating element is positioned in proximity to the mixer such that the surface of the mixer is heated, vaporization of the reductant into a vaporized reductant and mixing of the vaporized reductant with the exhaust gas is facilitated. In this way, the electrically heated mixer assembly can achieve a high mixing quality (e.g., at least 99% mixing quality), high deposit robustness for reductant dosing at low temperatures (e.g., less than approximately 160 degrees Celsius), and low air flow floss.

Embodiments of the disclosed subject matter can also be as set forth according to the following parentheticals.

(1) A mixer assembly for mixing a reductant with exhaust gas in a selective catalytic reduction (SCR) aftertreatment system, the SCR aftertreatment system including an exhaust conduit that permits the exhaust gas to enter a mixing tube of the SCR aftertreatment system and a reductant injector that injects the reductant into the mixing tube, the mixer assembly comprising: an electrically heated heating element, disposed within the mixing tube and in proximity to the reductant injector that generates heat; and a body disposed within the mixing tube in proximity to the electrically heated heating element and the reductant injector, the body including an impingement surface, wherein the impingement surface is located at a position that enables the impingement surface to be heated by the heat and that enables the reductant, after being injected by the reductant injector, to directly impinge on, and be heated by, the impingement surface causing the reductant to vaporize and become a vaporized reductant that mixes with the exhaust gas forming a vaporized reductant and exhaust gas mixture that flows along a flow path defined by the mixing tube, and wherein the electrically heated heating element is located within the flow path to heat, and further mix, the vaporized reductant and exhaust gas mixture.

(2) The mixer assembly according to (1), further comprising: a gas-phase mixer disposed within the mixing tube and within the flow path to enable the gas-phase mixer to further mix the vaporized reductant and exhaust gas mixture.

(3) The mixer assembly according to any one of (1) to (2), wherein the electrically heated heating element is heated via a power supply that provides a power output in a range of approximately 1 kilowatt to 1.5 kilowatts.

(4) The mixer assembly according to any one of (1) to (3), wherein the impingement surface is maintained at a constant temperature that is less than approximately 300 degrees Celsius.

(5) The mixer assembly according to any one of (1) to (4), wherein the body includes an inlet end and an outlet end, and wherein the electrically heated heating element is positioned at the outlet end of the body.

(6) The mixer assembly according to any one of (1) to (5), wherein the electrically heated heating element is a spiral coil.

(7) The mixer assembly according to any one of (1) to (6), further comprising at least one of: a diesel oxidation catalyst (DOC) positioned in proximity to the impingement surface, or a diesel particulate filter (DPF) positioned in proximity to the impingement surface.

(8) A method for mixing, in a mixing tube of an exhaust aftertreatment system, a reductant with an exhaust gas from an internal combustion engine, the method comprising: heating, by an electrically heated heating element positioned in proximity to an impingement surface of a mixer; injecting, by a reductant injector positioned in proximity to the impingement surface, the reductant causing the reductant to directly impinge on the impingement surface, vaporize, and mix with the exhaust gas forming a vaporized reductant and exhaust gas mixtures that flows along a flow path defined by the mixing tube; and heating and mixing, by the electrically heated heating element, the vaporized reductant and exhaust gas mixture before the vaporized reductant and exhaust gas enters a selective catalytic reduction (SCR) catalyst that is in fluid communication with the mixing tube.

(9) The method according to (8), further comprising: mixing, by a gas-phase mixer provided within the flow path, the vaporized reductant and exhaust gas mixture before the vaporized reductant and exhaust gas mixture enters the SCR catalyst.

(10) The method according to any one of (8) to (9), further comprising: maintaining, by the electrically heated heating element, the impingement surface at a constant temperature that is less than approximately 300 degrees Celsius.

(11) The method according to any one of (8) to (10), wherein the electrically heated heating element is heated via a power supply that provides a power output in a range of approximately 1 kilowatt to 1.5 kilowatts.

(12) The method according to any one of (8) to (11), wherein the mixer includes an inlet end and an outlet end, and wherein the electrically heated heating element is positioned at the outlet end of the mixer.

(13) The method according to any one of (8) to (12), wherein the electrically heated heating element is a spiral coil.

(14) The method according to any one of (8) to (13), further comprising: treating the exhaust gas using at least one of: a diesel oxidation catalyst (DOC) positioned in proximity to the reductant injector, or a diesel particulate filer (DPF) positioned in proximity to the reductant injector.

(15) A selective catalytic reduction (SCR) aftertreatment system for treating exhaust gas from an internal combustion engine, the SCR aftertreatment system comprising: a mixing tube including an inlet end, an outlet end, and an opening; a diesel exhaust fuel (DEF) injector, communicably coupled with the opening, that injects DEF into the mixing tube; and a mixer assembly including: an electrically heated heating element disposed within the mixing tube and in proximity to the reductant injector; a mixer, disposed within the mixing tube in proximity to the electrically heated heating element and the reductant injector, including an impingement surface; and an SCR catalyst positioned downstream of the electrically heated heating element and in fluid communication with the mixing tube, wherein the impingement surface is located at a position that enables the electrically heated heating element to heat the impingement surface and that enables direct impingement of the reductant, after being injected, on the impingement surface to vaporize and mix the reductant with the exhaust gas forming a vaporized reductant and exhaust gas mixture that flows along a flow path of the mixing tube, and wherein the electrically heated heating element is positioned within the flow path to heat and further mix the reductant and exhaust gas mixture before the reductant and exhaust gas mixture enters the SCR catalyst.

(16) The SCR aftertreatment according to (15), further comprising: a gas-phase mixer disposed within the mixing tube and within the flow path to enable the gas-phase mixer to further mix the vaporized reductant and exhaust gas mixture.

(17) The SCR aftertreatment according to any one of (15) to (16), wherein the electrically heated heating element is heated via a power supply that provides a power output in a range of approximately 1 kilowatt to 1.5 kilowatts.

(18) The SCR aftertreatment according to any one of (15) to (17), wherein the impingement surface is maintained at a constant temperature that is less than approximately 300 degrees Celsius.

(19) The SCR aftertreatment according to any one of (15) to (18), further comprising at least one of: a diesel oxidation catalyst (DOC) positioned in proximity to the DEF injector, or a diesel particulate filter (DPF) positioned in proximity to the DEF injector.

(20) The SCR aftertreatment according to any one of (15) to (19), further comprising an ammonia oxidation catalyst (AMOX) positioned downstream of the SCR catalyst.

To the extent that aspects of the present disclosure have been described above with reference to flowchart illustrations and/or block diagrams of methods, apparatus (systems) and computer program products according to embodiments of the present disclosure. In this regard, any flowchart and block diagrams in the figures illustrate the architecture, functionality, and operation of possible implementations of systems, methods, and computer program products according to various embodiments of the present disclosure.

For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A mixer assembly for mixing a reductant with exhaust gas in a selective catalytic reduction (SCR) aftertreatment system, the SCR aftertreatment system including an exhaust conduit that permits the exhaust gas to enter a mixing tube of the SCR aftertreatment system and a reductant injector that injects the reductant into the mixing tube, the mixer assembly comprising:
   an electrically heated heating element, disposed within the mixing tube and in proximity to the reductant injector that generates heat; and
   a body disposed within the mixing tube parallel to and separated from the electrically heated heating element, the body being in proximity to the reductant injector, the body including an impingement surface, wherein the impingement surface is located at a position that enables the impingement surface to be heated by the heat and that enables the reductant, after being injected by the reductant injector, to directly impinge on, and be heated by, the impingement surface causing the reductant to vaporize and become a vaporized reductant that mixes with the exhaust gas forming a vaporized reductant and exhaust gas mixture that flows along a flow path defined by the mixing tube, wherein the electrically heated heating element is located within the flow path,
   wherein the vaporized reductant and exhaust gas mixture is heated by the heat and further mixed by the electrically heated heating element.

2. The mixer assembly of claim 1, further comprising:
   a gas-phase mixer disposed within the mixing tube and within the flow path to enable the gas-phase mixer to further mix the vaporized reductant and exhaust gas mixture.

3. The mixer assembly of claim 1, wherein the electrically heated heating element is heated via a power supply that provides a power output in a range of approximately 1 kilowatt to 1.5 kilowatts.

4. The mixer assembly of claim 1, wherein the impingement surface is maintained at a constant temperature that is less than approximately 300 degrees Celsius.

5. The mixer assembly of claim 1,
   wherein the body includes an inlet end and an outlet end,
   wherein the electrically heated heating element is positioned at the inlet end of the body, and
   wherein the mixer assembly further comprises:
   a first aftertreatment component external to the mixing tube and in fluid communication therewith and with an exhaust conduit, the first aftertreatment component including a particulate filter and an oxidation catalyst; and
   a second aftertreatment component external to the mixing tube and in fluid communication therewith and with an exhaust stack, the second aftertreatment component including a selective reduction catalyst and an ammonia oxidation catalyst.

6. The mixer assembly of claim 1, wherein the electrically heated heating element is a spiral coil.

7. The mixer assembly of claim 1, further comprising at least one of:
   a diesel oxidation catalyst (DOC) positioned in proximity to the impingement surface, or a diesel particulate filter (DPF) positioned in proximity to the impingement surface.

8. A method for mixing, in a mixing tube of an exhaust aftertreatment system, a reductant with an exhaust gas from an internal combustion engine, the method comprising:
   heating, by an electrically heated heating element parallel to and separated from an impingement surface of a mixer;
   accepting the exhaust gas at a first aftertreatment component external to the mixing tube and in fluid communication therewith and with an exhaust conduit;
   injecting, by a reductant injector positioned in proximity to the impingement surface, the reductant causing the reductant to directly impinge on the impingement surface, vaporize, and mix with the exhaust gas forming a vaporized reductant and exhaust gas mixtures that flows along a flow path defined by the mixing tube;
   heating and mixing, by the electrically heated heating element, the vaporized reductant and exhaust gas mixture before the vaporized reductant and exhaust gas enters a gas phase mixer within the mixing tube; and
   accepting the heated exhaust mixture at a second aftertreatment component external to the mixing tube and in fluid communication therewith and with an exhaust stack.

9. The method of claim 8, further comprising:
   mixing, by the gas-phase mixer provided within the flow path, the vaporized reductant and exhaust gas mixture before the vaporized reductant and exhaust gas mixture enters the second aftertreatment component.

10. The method of claim 8, further comprising:
    maintaining, by the electrically heated heating element, the impingement surface at a constant temperature that is less than approximately 300 degrees Celsius.

11. The method of claim 8, wherein the electrically heated heating element is heated via a power supply that provides a power output in a range of approximately 1 kilowatt to 1.5 kilowatts.

12. The method of claim 8,
    wherein the mixer includes an inlet end and an outlet end, and
    wherein the electrically heated heating element is positioned at the inlet end of the mixer.

13. The method of claim 8, wherein the electrically heated heating element is a spiral coil.

14. The method of claim 8, further comprising:
treating the exhaust gas using at least one of:
a diesel oxidation catalyst (DOC) or a diesel particulate filer (DPF) positioned within the first aftertreatment component.

15. A selective catalytic reduction (SCR) aftertreatment system for treating exhaust gas from an internal combustion engine, the SCR aftertreatment system comprising:
a mixing tube including an inlet end, an outlet end, and an opening;
a diesel exhaust fuel (DEF) injector, communicably coupled with the opening, that injects DEF into the mixing tube; and
a mixer assembly including:
an electrically heated heating element disposed within the mixing tube and in proximity to the DEF injector;
a mixer, disposed within the mixing tube parallel to and removed from the electrically heated heating element and the DEF injector, including an impingement surface; and
an SCR catalyst positioned downstream of the electrically heated heating element and in fluid communication with and external to the mixing tube,
wherein the impingement surface is located at a position that enables the electrically heated heating element to heat the impingement surface and that enables direct impingement of the reductant, after being injected, on the impingement surface to vaporize and mix the reductant with the exhaust gas forming a vaporized reductant and exhaust gas mixture that flows along a flow path of the mixing tube, and
wherein the electrically heated heating element is positioned within the flow path to heat and further mix the reductant and exhaust gas mixture before the reductant and exhaust gas mixture enters the SCR catalyst.

16. The SCR aftertreatment system of claim 15, further comprising:
a gas-phase mixer disposed within the mixing tube and within the flow path to enable the gas-phase mixer to further mix the vaporized reductant and exhaust gas mixture.

17. The SCR aftertreatment system of claim 15, wherein the electrically heated heating element is heated via a power supply that provides a power output in a range of approximately 1 kilowatt to 1.5 kilowatts.

18. The SCR aftertreatment system of claim 15, wherein the impingement surface is maintained at a constant temperature that is less than approximately 300 degrees Celsius.

19. The SCR aftertreatment system of claim 15, further comprising at least one of:
a diesel oxidation catalyst (DOC) positioned in proximity to the DEF injector and within an external first aftertreatment component, or a diesel particulate filter (DPF) positioned in proximity to the DEF injector and within the external first aftertreatment component that is in fluid communication with an exhaust conduit.

20. The SCR aftertreatment system of claim 15, further comprising an ammonia oxidation catalyst (AMOX) positioned downstream of the SCR catalyst and within an external second aftertreatment component that is in fluid communication with an exhaust stack.

* * * * *